US010589200B1

(12) United States Patent
Maresh

(10) Patent No.: US 10,589,200 B1
(45) Date of Patent: *Mar. 17, 2020

(54) GRAVITY FLUID FILTRATION SYSTEM

(71) Applicant: Joseph D Maresh, West Linn, OR (US)

(72) Inventor: Joseph D Maresh, West Linn, OR (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/402,221

(22) Filed: Jan. 9, 2017

Related U.S. Application Data

(63) Continuation-in-part of application No. 14/181,480, filed on Feb. 14, 2014, now Pat. No. 9,975,068.

(60) Provisional application No. 62/387,871, filed on Jan. 8, 2016.

(51) Int. Cl.
*B01D 29/60* (2006.01)
*B01D 29/90* (2006.01)

(52) U.S. Cl.
CPC ........... *B01D 29/605* (2013.01); *B01D 29/90* (2013.01)

(58) Field of Classification Search
None
See application file for complete search history.

(56) References Cited

U.S. PATENT DOCUMENTS 3,695,241 A * 10/1972 Peterson .................. F01L 1/16
  123/90.19
9,975,068 B1 * 5/2018 Maresh ..................... C02F 1/00

* cited by examiner

*Primary Examiner* — Richard C Gurtowski
(74) *Attorney, Agent, or Firm* — Nick A Nichols, Jr.

(57) ABSTRACT

In a gravity filtration system, upper and lower fluid reservoirs may be mated together. Unfiltered fluid may be supplied to the upper reservoir. One or more filters provide fluid communication between the upper and lower fluid reservoirs. Fluid may pass through the filters into the lower fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position may permit unfiltered fluid to be supplied to the upper reservoir. Supply of unfiltered fluid to the upper reservoir may be stopped upon actuation of the fluid supply valve to the closed position. Actuation of the fluid supply valve is a function of the weight of the fluid in the filtration system and/or vertical travel of the moveable platform.

11 Claims, 3 Drawing Sheets

GRAVITY FLUID FILTRATION SYSTEM

CROSS-REFERENCE TO RELATED APPLICATION

This is a continuation-in-part application of non-provisional U.S. patent application Ser. No. 14/181,480, filed Feb. 14, 2014, and claims the benefit of U.S. Provisional Application Ser. No. 62/387,871, filed Jan. 8, 2016, which applications are incorporated herein in their entirety by reference.

BACKGROUND

The present invention relates generally to gravity filtration apparatus and more particularly to a gravity fluid filtration system including an automatic filling device for a gravity water filtration apparatus which eliminates the periodic manual fill requirements of prior art gravity filtration devices, and may further include remote reservoirs which may be automatically kept full.

Typically, prior art water filtration devices consist of filter(s) having outer regions in working contact with the upper unfiltered water reservoir and the output core region of the filter is connected to the lower filtered water reservoir. A filter flange seal may be installed between the upper reservoir and the filter output core to maintain fluid isolation between the upper and lower water reservoirs. These prior art water filtration devices, however, tend to allow filtered water to overflow between the mating surfaces of the two reservoirs in the event water is added when the gravity filtration system is at full capacity, as more fully discussed in Applicant's pending application Ser. No. 13/942,852, filed Jul. 16, 2013, and pending application Ser. No. 14/181,480, filed Feb. 14, 2014, which applications are incorporated herein in their entirety by reference.

SUMMARY

In a gravity filtration system, upper and lower fluid reservoirs may be mated together. Unfiltered fluid may be supplied to the upper reservoir. One or more filters provide fluid communication between the upper and lower fluid reservoirs. Fluid may pass through the filters into the lower fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position may permit unfiltered fluid to be supplied to the upper reservoir. Supply of unfiltered fluid to the upper reservoir may be stopped upon actuation of the fluid supply valve to the closed position. Actuation of the fluid supply valve is a function of the weight of the fluid in the filtration system and/or vertical travel of the moveable platform.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
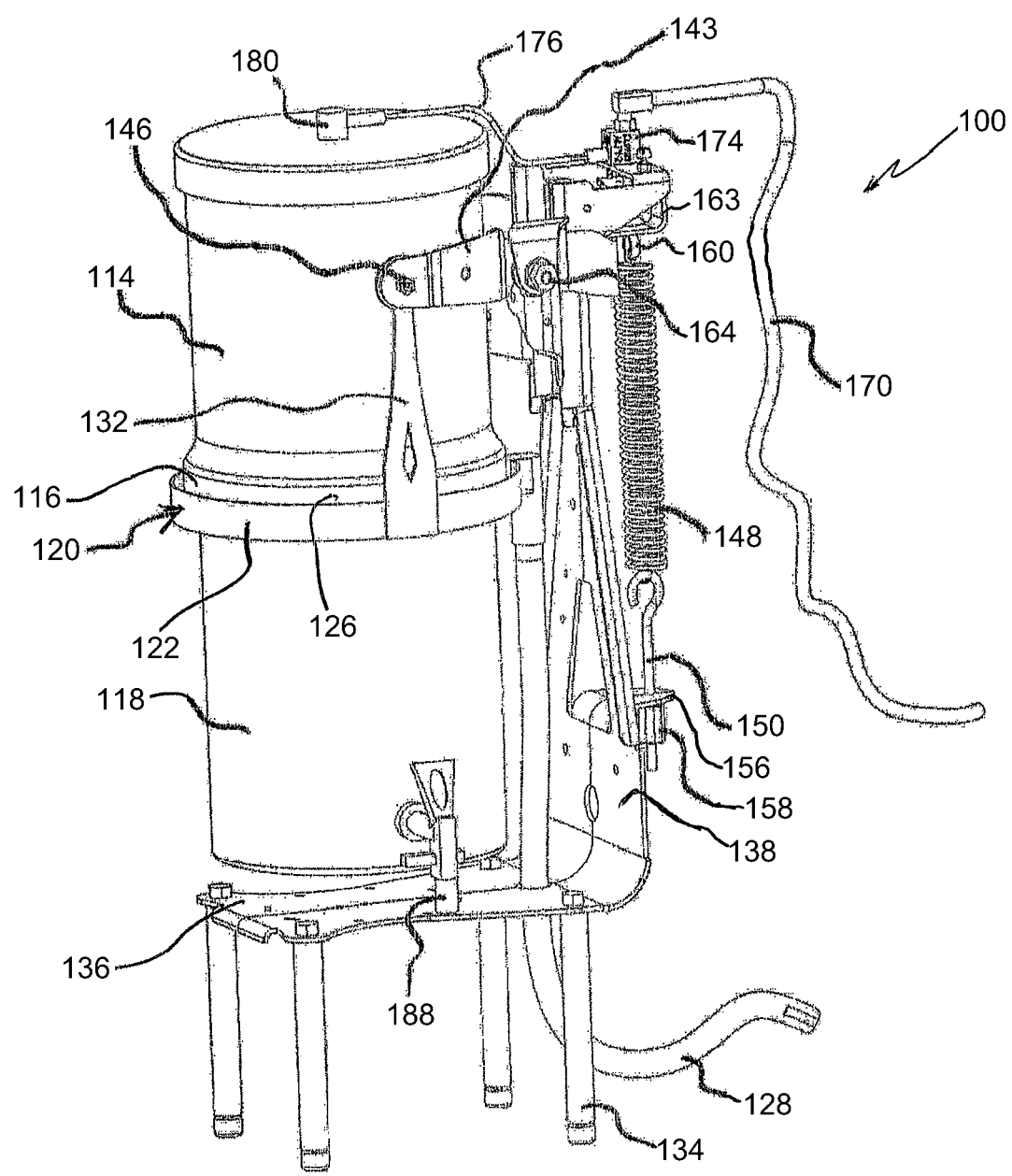
FIG. 1 is a perspective view of a gravity fluid filtration system.

In the drawings and description that follows, like parts are marked throughout the specification and drawings with the same reference numerals. The drawing figures are not necessarily to scale. Certain features may be shown exaggerated in scale or in somewhat schematic form and some details of conventional elements may not be shown in the interest of clarity and conciseness. The invention is subject to embodiments of different forms. Specific embodiments directed to gravity fluid filtration systems are described in detail herein and are shown in the drawings, with the understanding that the disclosure is to be considered an exemplification of the principles of the invention, and is not intended to limit the invention to the illustrated and described embodiments. The different teachings of the embodiments discussed below may be employed with various fluids or separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 2:
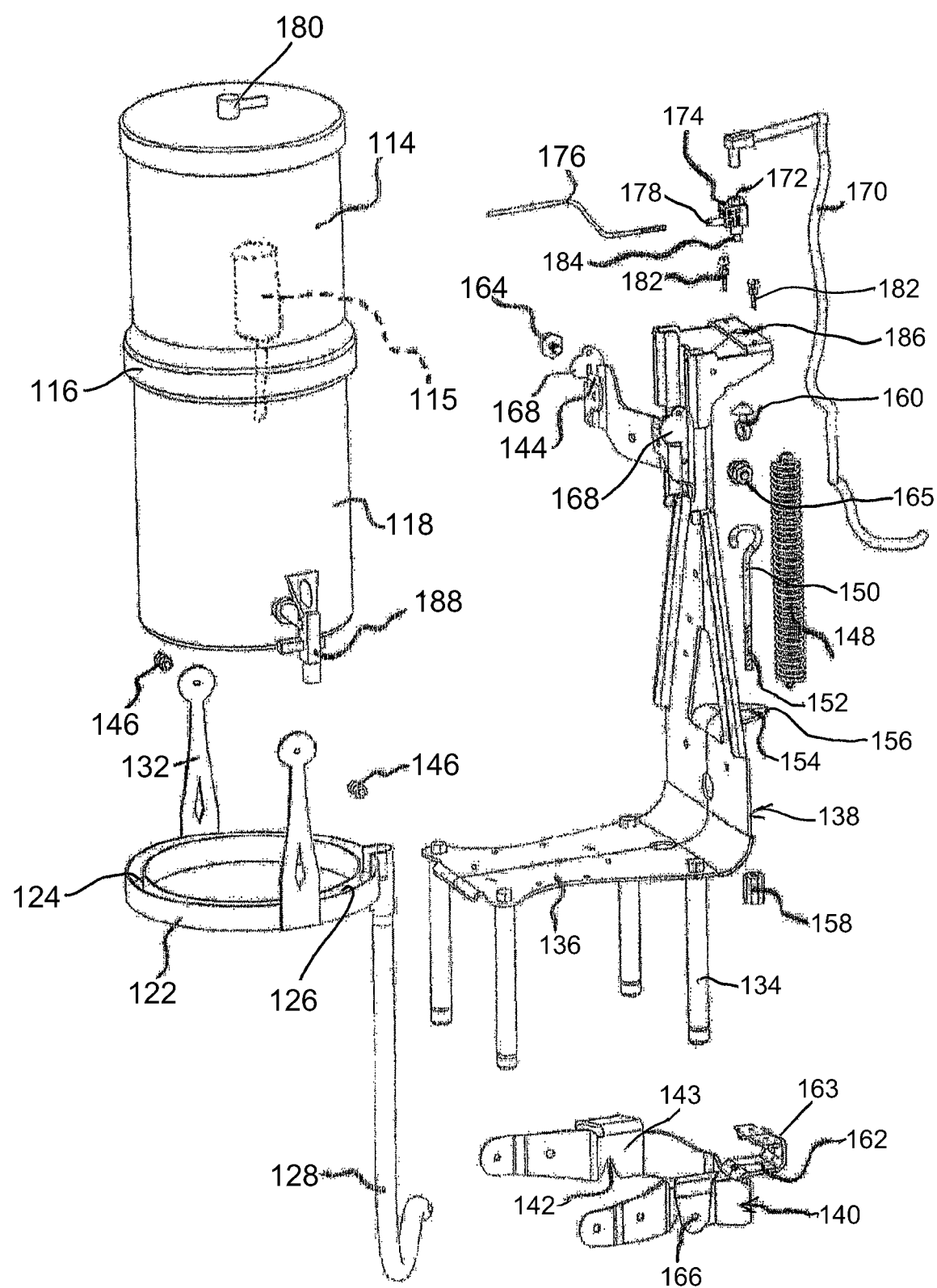
FIG. 2 is an exploded perspective view of the gravity fluid filtration system shown in FIG. 1.

Directing attention now to the figures, a first embodiment of a gravity filtration apparatus generally identified by the reference numeral 100 is shown in FIGS. 1 and 2. The gravity filtration apparatus 100 may include an upper fluid reservoir 114 and a lower fluid reservoir 118 mated together in an unsealed manner. Unfiltered fluid, such as but without limitation, water, may be supplied to the upper reservoir 114 and filtered through one or more filters 115 mounted in the upper reservoir 114 so that filtered water is discharged into the lower reservoir 118 of the gravity filtration apparatus 100. The fluid reservoirs 114, 118 are depicted as having a cylindrical shape for illustrative purposes. It is understood however that the fluid reservoirs 114, 118 are not limited to a particular size or shape. A circumferential flange 116 fixed about the lower region of the upper reservoir 114 may be sized and configured to provide a friction connection with the upper outer region of the lower reservoir 118 when the water reservoirs 114, 118 are mated together as shown in FIG. 1.

The stacked or mated fluid reservoirs 114, 118 may be supported by suspension assembly including a ring 120 slid over the lower reservoir 118. The ring 120 may include inner and outer circumferential sidewalls 122 and a bottom wall 124 defining an open circumferential trough or channel 126. The inner sidewall 122 of the ring 120 may engage an unillustrated outwardly extending circumferential rolled edge proximate the upper end of the lower reservoir 118. A drain hose 128 may be connected to a drain opening in the channel 126. While leakage between the reservoirs 114, 118 is not expected, the friction connection therebetween is not water tight and filtered water from the lower reservoir 118 may overflow into the channel 126 in the event the lower reservoir 118 is filled with water above its overflow level due to valve leakage and/or other system malfunctions. The outlet end of the drain hose 128 may be placed in the nearest sink, plumbed into a household drain line, or simply directed outdoors.

Referring still to FIG. 1, the mated fluid reservoirs 114, 118 may be suspended on a frame 130. Hanger members 132 may be fixedly secured to the ring 120 diametrically opposite each other. The ring 120 and hanger members 132 support the weight of the reservoirs 114, 118 and the weight of the fluid contained in the apparatus 100.

The frame 130 may be supported on a surface, for example but without limitation, a counter top and the like, on legs 134. The frame 130 may include a base 136 and an upstanding frame member 138 extending upwardly from the base 136. A pivot yoke 140 may be pivotally supported on the frame member 138. The pivot yoke 140 may include inverted V-shaped notches 142 on yoke arms 143 for engagement with knife edges 144 on the frame member 138. That is, the pivot yoke 140 may hang on the frame member 138 and may pivot about knife edges 144, which are spaced apart on the frame member 138. Hanger members 132 may be pivotally connected to the yoke 140 at pins 146 proximate the distal ends of the yoke arms 143.

A lower distal end of a spring 148 may be hooked to a hook 150 that is adjustably secured to frame member 138. The hook 150 may include a threaded portion 152 extending through a hole 154 of a mounting tab 156 of the frame member 138. A knob 158 may be threaded on the hook 150 for adjusting the tension in the spring 148, and thereby adjusting the biasing force applied to the yoke 140. An upper distal end of the spring 148 may be secured to an eyelet hook 160 threadedly secured to the yoke 140 at threaded hole 162 of a yoke extension 163. The yoke 140 may be laterally centered relative to the frame member 138 by jam bolts 164 threaded through yoke holes 166. The jam bolts 164 may be tightened to near contact with side bosses 168 of the frame member 138.

Fluid may be supplied to the upper reservoir 114 through a tube or hose 170 connected to a fluid source. The hose 270 may be connected to an inlet port 172 of a valve 174. A regulated fluid supply tube 176 may be connected between an outlet port 178 of the valve 174 and an inlet port 180 of the upper reservoir 114.

During operation of the gravity filtration apparatus 100, the yoke 140 may rotate or pivot about the pivot points formed by the knife edges 144 of the frame member 138. The knife edges 144 define a pivot axis coincident with a longitudinal axis defined by the jam bolts 164. Stop safety bolts 182 may be secured to the frame member 138 for limiting the upward pivot movement of the yoke extension 163, thereby preventing overload of the valve trigger 184 and associated valve components of the valve 174. The valve 174 may be mounted to the frame 130 so that the valve trigger 184 extends downward through a hole 186 in the frame member 138.

The valve trigger 184 may be actuated as the yoke extension 163 pivots upward and exerts a force against the valve trigger 184. The valve 178 depicted in FIG. 1 may be normally closed. As fluid is removed from the lower reservoir 118 through a spigot 188 and the like, the biasing force of the spring 148 pivots the rearward portion of the yoke 140 downward due to the reduction in fluid weight of the gravity filtration apparatus 100. As the yoke extension 163 pivots downward releasing the force exerted against the valve trigger 184, the valve 174 opens permitting fluid to be supplied to the upper reservoir 114 through the regulated fluid supply tube 176. As fluid is added, the weight of the fluid contained in the gravity filtration apparatus 100 increases to predetermined levels and thereby pivoting the yoke 140 so that the forward portion rotates downward and the yoke extension 163 upward against the valve trigger 184 to close the valve 174.

Figure 3:
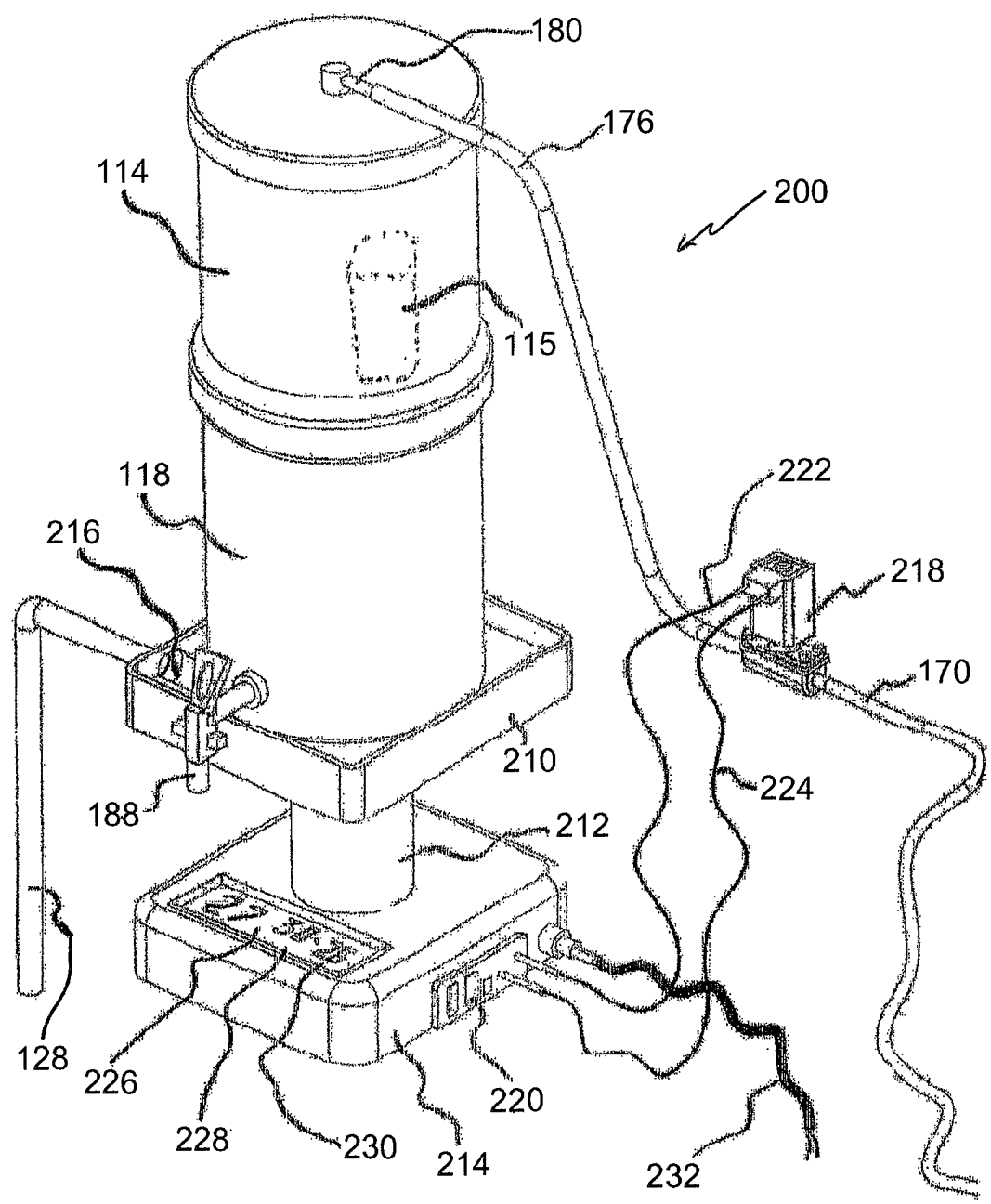
FIG. 3 is a perspective view of a second embodiment of a gravity fluid filtration system.

Referring now to FIG. 3, a second embodiment of a gravity filtration apparatus is generally identified by the reference numeral 200. The gravity filtration apparatus may include an upper fluid reservoir 114 mated to a lower fluid reservoir 118 in an unsealed manner discussed above with reference to gravity filtration system 100 in greater detail. Unfiltered fluid supplied to the upper reservoir 114 may be filtered through one or more filters 115 mounted in the upper reservoir 114 into the lower reservoir 118. Filtered fluid, such as but without limitation, water, may be delivered for use through a spigot 188. The mated reservoirs 114, 118 may be supported by a platform 210 mounted on a column 212 secured on an electronic scale 214. A drain hose 128 may be connected to a platform drain 216 to drain fluid to a sink, into a household drain line, or simply directed outdoors in the event of a scale and/or valve malfunction (or power failure) resulting leakage or overflow conditions.

Unfiltered fluid may be supplied to the gravity filtration apparatus 200 through a supply line 170 having one end connected to a fluid source and the opposite end connected to a supply valve 218. An electric actuator, solenoid, motor screw, or other electronic device may open or close the supply valve 218 as a function of the overall weight of the reservoirs 114, 118 filled with fluid. The scale 214 may be programmable and may include program buttons or switches 220 to set activation points for relay outputs 222 and/or 224 utilized to monitor the weight of the fluid contained by the gravity filtration apparatus 200, where for example but without limitation, the supply valve 218 opens when the water weight drops below 26 pounds (indicator 226), and the supply valve 218 closes when the water weight exceeds 30 pounds (indicator 228). An actual water weight reading of 27 pounds (indicator 230) is illustrated in the display of the example depicted in FIG. 3. With electronic scales, travel of the platform 210 up or down may be minimal. Electronic power for the scale 214 may be provided by batteries, including rechargeable batteries, and/or a power cord 232 plugged into a household electrical outlet.

While preferred embodiments of the invention have been shown and described, other and further embodiments of the invention may be devised without departing from the basic scope thereof, and the scope thereof is determined by the claims which follow.

The invention claimed is:

1. A gravity filtration system, comprising:
   a) a frame designed to rest upon a substantially flat surface;
   b) an upper fluid reservoir and a lower fluid reservoir mated together in separable substantially vertical alignment;
   c) a fluid supply valve operatively connected between an unfiltered fluid source and said upper fluid reservoir, wherein said fluid supply valve is actuatable to an open or closed position as a function of changes in total weight of fluid in said upper fluid reservoir and said lower fluid reservoir to initiate or terminate flow of unfiltered fluid to said upper fluid reservoir; and
   d) a biasing member operatively connected to said fluid supply valve.

2. The gravity filtration system of claim 1 including a suspension assembly supporting said upper and lower fluid reservoirs on said frame.

3. The gravity filtration system of claim 2 wherein said suspension assembly includes a ring and a pair of hanger members fixedly secured to said ring diametrically opposite each other, said ring configured for supporting engagement about an upper region of said lower fluid reservoir.

4. The gravity filtration system of claim 3 wherein said suspension assembly includes a yoke member pivotally supported on said frame.

5. The gravity filtration system of claim 4 wherein said biasing member comprises a spring having one end connected to said yoke member and an opposite end connected to said frame.

6. The gravity filtration system of claim 5 wherein said frame includes a base and an upstanding frame member extending upwardly from said base, said frame member including laterally extending arm members having spaced apart knife edges defining a longitudinal pivot axis.

7. The gravity filtration system of claim 6 wherein said yoke member includes laterally extending yoke arms, each said yoke arms including a notch for cooperative engagement with respective said knife edges of said frame member.

8. The gravity filtration system of claim 7 wherein said fluid supply valve includes a valve trigger in actuatable contact with said yoke member, wherein pivotal movement of said yoke member actuates said valve trigger to open or close said fluid supply valve.

9. The gravity filtration system of claim 1 wherein said ring includes a circumferential overflow channel, said overflow channel including a drain opening.

10. A gravity filtration system, comprising:
   a) a frame designed to rest upon a substantially flat surface;
   b) a suspension assembly connected to said frame supporting an upper fluid reservoir and a lower fluid reservoir mated together in separable substantially vertical alignment;
   c) said suspension assembly including a yoke member pivotally supported on said frame; and
   d) a fluid supply valve operatively connected between an unfiltered fluid source and said upper fluid reservoir, wherein said fluid supply valve includes a valve trigger in actuatable contact with said yoke member, wherein pivotal movement of said yoke member actuates said valve trigger to open and close said fluid supply valve.

11. The gravity filtration system of claim 10 including a biasing member operatively interconnected between said frame and said yoke member.

* * * * *